United States Patent
Goto

(10) Patent No.: US 12,441,870 B2
(45) Date of Patent: *Oct. 14, 2025

(54) ZrO2 DISPERSION LIQUID

(71) Applicant: KANTO DENKA KOGYO CO., LTD., Tokyo (JP)

(72) Inventor: Yuki Goto, Shibukawa (JP)

(73) Assignee: KANTO DENKA KOGYO CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/718,897

(22) PCT Filed: Dec. 14, 2022

(86) PCT No.: PCT/JP2022/046004
§ 371 (c)(1),
(2) Date: Jun. 12, 2024

(87) PCT Pub. No.: WO2023/112953
PCT Pub. Date: Jun. 22, 2023

(65) Prior Publication Data
US 2025/0051550 A1 Feb. 13, 2025

(30) Foreign Application Priority Data

Dec. 14, 2021 (JP) ................. 2021-202350

(51) Int. Cl.
*C08K 9/06* (2006.01)
*C09C 3/12* (2006.01)

(52) U.S. Cl.
CPC .............. *C08K 9/06* (2013.01); *C09C 3/12* (2013.01); *C01P 2004/64* (2013.01); *C01P 2006/12* (2013.01); *C08K 2201/006* (2013.01); *C08K 2201/011* (2013.01)

(58) Field of Classification Search
CPC .... C01P 2006/12; C01P 2004/64; C09C 3/12; C09C 1/00; C08K 9/06; C08K 2003/2244; C08K 2201/011; C08K 2201/006; C09D 17/00; C09D 201/00; C09D 7/62

See application file for complete search history.

(56) References Cited

U.S. PATENT DOCUMENTS

| 2009/0029482 | A1 | 1/2009 | Usuki et al. |
| 2017/0342234 | A1 | 11/2017 | Takeshita et al. |
| 2017/0349780 | A1* | 12/2017 | Takeshita ............... C09D 5/006 |

FOREIGN PATENT DOCUMENTS

| JP | 11140476 A | * | 5/1999 |
| JP | 2011202016 A | | 10/2011 |
| JP | 201231306 A | | 2/2012 |
| JP | 2012214339 A | | 11/2012 |
| JP | 202166757 A | | 4/2021 |
| WO | 2007126151 A1 | | 11/2007 |
| WO | 2016093014 A1 | | 6/2016 |
| WO | 2019017305 A1 | | 1/2019 |

OTHER PUBLICATIONS

International Search Report, with English translation, issued in corresponding International Application No. PCT/JP2022/046004, date of mailing Feb. 7, 2023 (5 pages).
Written Opinion of the International Searching Authority issued in corresponding International Application No. PCT/JP2022/046004, date of mailing Feb. 7, 2023 (4 pages).
Gen Liu et al., Surface Functionalization of zirconium dioxide nano-adsorbents with 3-aminopropyl triethoxysilane and promoted adsorption activity for bovine serum albumin, Materials Chemistry and Physics, pp. 129-135, 2016 (7 pages).
English Translation of the International Preliminary Report on Patentability, issued in corresponding International Application No. PCT/JP2022/046004, Date of Mailing Jun. 20, 2024 (4 pages).

* cited by examiner

*Primary Examiner* — Vishal V Vasisth
(74) *Attorney, Agent, or Firm* — FLYNN THIEL, P.C.

(57) ABSTRACT

A $ZrO_2$ dispersion liquid containing, a $ZrO_2$ particle coated with a silane coupling agent, and a dispersion medium for the $ZrO_2$ particle, wherein a BET specific surface area of the $ZrO_2$ particle coated with the silane coupling agent obtained by removing the dispersion medium is 36% or more of a BET specific surface area of the $ZrO_2$ particle before coating with the silane coupling agent.

10 Claims, No Drawings

ZrO2 DISPERSION LIQUID

This application is a 371 of PCT/JP2022/046004 filed Dec. 14, 2022.

FIELD OF THE INVENTION

The present invention relates to a $ZrO_2$ dispersion liquid, a curable composition and a method for producing a $ZrO_2$ dispersion liquid.

BACKGROUND OF THE INVENTION

Inorganic particle powders are widely used for imparting various properties in a wide variety of applications such as rubber or resin compositions, paints, lubricants and others. Further, affinity between inorganic particle powders and lubricants or the like is increased by coating the surface of inorganic particles with coupling agents.

JP-A 2011-202016 discloses a method for producing a functional inorganic particle powder including, mixing and stirring an inorganic particle powder and a coupling agent to coat the particle surface of the inorganic particle powder with the coupling agent, and thereafter further allowing a higher fatty acid to adhere to the surface of the coating of the coupling agent, wherein all the treatment processes are performed by a dry process.

JP-A 2012-214339 discloses an inorganic nanoparticle dispersion liquid containing, an inorganic nanoparticle with an average primary particle size of 1 to 50 nm, a hydrolysate of a silane coupling agent, a predetermined dispersant and a dispersion medium.

WO-A 2016-093014 discloses a production process for producing a dispersion of fine inorganic particles using a media type wet dispersing machine, wherein when supplying (A) zirconium oxide nanoparticles, (B) a silane coupling agent, (C) a dispersing medium and (D) a dispersant to the wet dispersing machine, at least (D) is supplied last.

SUMMARY OF THE INVENTION

The present invention provides a $ZrO_2$ dispersion liquid which is highly transparent and stable and has good compatibility with resins and others.

The present invention relates to a $ZrO_2$ dispersion liquid containing, a $ZrO_2$ particle coated with a silane coupling agent, and a dispersion medium for the $ZrO_2$ particle, wherein a BET specific surface area of the $ZrO_2$ particle coated with the silane coupling agent obtained by removing the dispersion medium is 36% or more of a BET specific surface area of the $ZrO_2$ particle before coating with the silane coupling agent.

Further, the present invention relates to a curable composition containing the above $ZrO_2$ dispersion liquid.

Further, the present invention relates to a method for producing a $ZrO_2$ dispersion liquid containing a $ZrO_2$ particle coated with a silane coupling agent, including: mixing the $ZrO_2$ particle with a dispersion medium for the $ZrO_2$ particle; and reacting the $ZrO_2$ particle with the silane coupling agent in the obtained mixture, wherein the reaction of the $ZrO_2$ particle with the silane coupling agent is carried out until a BET specific surface area of the $ZrO_2$ particle coated with the silane coupling agent obtained by removing the dispersion medium from the mixture during the reaction reaches 36% or more of a BET specific surface area of the $ZrO_2$ particle before coating with the silane coupling agent.

The present invention can provide a $ZrO_2$ dispersion liquid which is highly transparent and stable and has good compatibility with resins and others.

EMBODIMENTS OF THE INVENTION

The inventors found out that when a reaction of a $ZrO_2$ particle with a silane coupling agent is carried out in a liquid, dispersion stability of the $ZrO_2$ particle coated with the silane coupling agent and compatibility of the $ZrO_2$ particle with resins and others are affected by a surface condition of the $ZrO_2$ particle. This surface condition of the $ZrO_2$ particle is indirectly determined by means of a proportion of a BET specific surface area of the $ZrO_2$ particle coated with the silane coupling agent to a BET specific surface area of the $ZrO_2$ particle before coating with the silane coupling agent (hereinafter also referred to as a proportion of a post-coating BET specific surface area), wherein the $ZrO_2$ particle coated with the silane coupling agent is obtained by removing a dispersion medium from the $ZrO_2$ dispersion liquid, and the BET specific surface area thereof is measured.

The $ZrO_2$ dispersion liquid of the present invention attains improved dispersion stability of the $ZrO_2$ particle, as well as having improved compatibility with resins and others as the $ZrO_2$ particle is reacted with the silane coupling agent such that the proportion of the post-coating BET specific surface area falls within the predetermined range. Thus, the $ZrO_2$ dispersion liquid has an improved transmittance, and compositions containing the coated $ZrO_2$ particle when the $ZrO_2$ dispersion liquid is applied to various uses have improved transparency.

<$ZrO_2$ Dispersion Liquid>

The $ZrO_2$ dispersion liquid of the present invention contains a $ZrO_2$ particle coated with a silane coupling agent (hereinafter also referred to as a coated $ZrO_2$ particle) and a dispersion medium for the $ZrO_2$ particle, wherein a BET specific surface area of the $ZrO_2$ particle coated with the silane coupling agent obtained by removing the dispersion medium is 36% or more of a BET specific surface area of the $ZrO_2$ particle before coating with the silane coupling agent (hereinafter also referred to as an uncoated $ZrO_2$ particle).

Further, the $ZrO_2$ dispersion liquid of the present invention may be a $ZrO_2$ dispersion liquid containing a $ZrO_2$ particle reacted with a silane coupling agent by a wet process, wherein a BET specific surface area of the $ZrO_2$ particle coated with the silane coupling agent obtained by removing a dispersion medium from a mixture containing the $ZrO_2$ particle coated with the silane coupling agent and the dispersion medium after the wet-process reaction is 36% or more of a BET specific surface area of the $ZrO_2$ particle before coating with the silane coupling agent.

Note that, in the present invention, "being reacted by a wet process" may mean that, when a $ZrO_2$ particle is reacted with a silane coupling agent, the $ZrO_2$ particle and a dispersion medium are mixed respectively in an amount of less than 90 mass % and in an amount of more than 10 mass % relative to a total mixing amount of the $ZrO_2$ particle, the silane coupling agent and the dispersion medium, and the reaction of the $ZrO_2$ particle with the silane coupling agent is carried out.

First, the $ZrO_2$ particle before coating with the silane coupling agent, in other words, the uncoated $ZrO_2$ particle is explained. The uncoated $ZrO_2$ particle can be obtained, for example, by a hydrothermal process or the like.

Examples of a shape of the uncoated $ZrO_2$ particle are not particularly limited and preferably include powder and granule shapes such as a spherical shape, an ellipsoidal shape, rectangular cuboid and other cuboid shapes and others, a cylindrical shape, an elliptical disk shape, polygonal plate shapes such as a scale-like shape and others, a needle shape, and others, and a spherical shape or an ellipsoidal shape is more preferable. Note that a shape of the coated $ZrO_2$ particle is preferably also the same shape as in the case of the uncoated $ZrO_2$ particle.

As the uncoated $ZrO_2$ particle, a $ZrO_2$ particle with an average primary particle size of preferably 1.0 nm or more and 50.0 nm or less, more preferably 3.0 nm or more and 20.0 nm or less and further preferably 5.0 nm or more and 15.0 nm or less can be used. When the uncoated $ZrO_2$ particle is not spherical, this average primary particle size is a particle size of a circumscribed sphere of the uncoated $ZrO_2$ particle. Note that an average primary particle size of the coated $ZrO_2$ particle is also the same as in the case of the uncoated $ZrO_2$ particle, and the average primary particle size of the coated $ZrO_2$ particle preferably falls within the above range.

This average primary particle size is a numerical value determined from an average value of particle sizes of 200 or more particles arbitrarily measured from TEM images obtained from observation with a transmission electron microscope (TEM).

The absence of coarse and large particles improves transparency of the $ZrO_2$ dispersion liquid and a curable composition containing the $ZrO_2$ dispersion liquid. When the above average primary particle size is 1.0 nm or more, increase in agglomeration force exerted between particles due to micronization is suppressed, and the $ZrO_2$ particle is easily dispersed in the $ZrO_2$ dispersion liquid and the curable composition.

A coefficient of variation ((standard deviation o/average primary particle size)×100(%)) of a particle size distribution of the uncoated $ZrO_2$ particle is preferably 1.0% or more and 40.0% or less and more preferably 1.0% or more and 30.0% or less. The uniform particle size of the uncoated $ZrO_2$ particle and the absence of coarse and large particles improves transparency of the $ZrO_2$ dispersion liquid and the curable composition. Note that a coefficient of variation of a particle size distribution of the coated $ZrO_2$ particle preferably also falls within the same range as in the case of the uncoated $ZrO_2$ particle.

The BET specific surface area of the uncoated $ZrO_2$ particle is preferably 10 $m^2$/g or more and 1000 $m^2$/g or less, more preferably 50 $m^2$/g or more and 300 $m^2$/g or less and further preferably 70 $m^2$/g or more and 200 $m^2$/g or less. The BET specific surface area is a BET specific surface area value measured by a single-point method using a device for measuring a specific surface area of powder (for example, a fully automatic BET specific surface area measurement device (Macsorb HM Model-1210) manufactured by MOUNTECH Co., Ltd.) in accordance with JIS Z-8830 (Determination of the specific surface area of powders by gas adsorption). The absence of coarse and large particles improves transparency of the $ZrO_2$ dispersion liquid and the curable composition. The BET specific surface area of the coated $ZrO_2$ particle can also be measured by the same method using the coated $ZrO_2$ particle obtained by removing the dispersion medium.

The dispersion medium is not particularly limited as long as it enables the coated $ZrO_2$ particle to be dispersed. As the dispersion medium, for example, water or an organic compound can be used. Either a single dispersion medium or a combination of multiple dispersion media can be used.

The organic compound as the dispersion medium can be selected from compounds known as organic solvents. Specific examples of the organic compound as the dispersion medium can include methanol, ethanol, isopropanol, butanol, cyclohexanol, methyl ethyl ketone, methyl isobutyl ketone, cyclohexanone, ethyl acetate, propyl acetate, butyl acetate, methyl cellosolve, cellosolve, butyl cellosolve, cellosolve acetate, propylene glycol monomethyl ether, propylene glycol monomethyl ether acetate, tetrahydrofuran, 1,4-dioxane, n-hexane, cyclopentane, toluene, xylene, N, N-dimethylformamide, N, N-dimethylacetamide, dichloromethane, trichloroethane, trichloroethylene, hydrofluoroether or the like.

The organic compound as the dispersion medium can also be selected from compounds known as monomers. Examples of the monomers include (meth)acrylic monomers and further monofunctional (meth)acrylic monomers or polyfunctional (meth)acrylic monomers. Examples of the monofunctional (meth)acrylic monomers include aromatic ring-containing acrylates, alicyclic skeleton-containing acrylates and monofunctional alkyl (meth)acrylates. Examples of the polyfunctional (meth)acrylic monomers include bi-, tri- and tetrafunctional (meth)acrylates. The (meth)acrylic monomers may be modified products with ethylene oxide or propylene oxide.

Examples of the aromatic ring-containing acrylates include phenoxyethyl acrylate, phenoxy 2-methylethyl acrylate, phenoxy ethoxy ethyl acrylate, 3-phenoxy-2-hydroxypropyl acrylate, 2-phenylphenoxyethyl acrylate, benzyl acrylate, phenyl acrylate, phenyl benzyl acrylate, paracumyl phenoxy ethyl acrylate and others. A composition containing an aromatic ring-containing acrylate and a cured product thereof have high refractive indices, and are preferable.

Examples of the alicyclic skeleton-containing acrylates include 2-acryloyloxy ethyl hexahydrophthalate, cyclohexyl acrylate, dicyclopentanyl acrylate, tetrahydrofurfuryl acrylate, dicyclopentanyl methacrylate, isobornyl methacrylate and others. A composition containing an alicyclic skeleton-containing acrylate and a cured product thereof have high Abbe numbers, and are preferable as optical materials.

Examples of the monofunctional alkyl (meth)acrylates include methyl (meth)acrylate, octyl (meth)acrylate, isostearyl (meth)acrylate, hydroxyethyl (meth)acrylate, ethylene oxide-modified alkyl (meth)acrylates, propylene oxide-modified alkyl (meth)acrylates, hydroxypropyl (meth)acrylate and others. Monofunctional alkyl (meth)acrylates have low viscosity, and are preferable.

Examples of the polyfunctional (meth)acrylates include bifunctional (meth)acrylates such as (poly)ethylene glycol di(meth)acrylate, (poly)propylene glycol di(meth)acrylate, neopentyl glycol di(meth)acrylate, 1,6-hexanediol di(meth) acrylate, 1,9-nonanediol di(meth)acrylate and others, and tri- and tetrafunctional (meth)acrylates such as glycerol tri(meth)acrylate, trimethylolpropane tri(meth)acrylate, tri (meth)acrylate phosphate, pentaerythritol tetra(meth)acrylate and others. Tri- and tetrafunctional (meth)acrylates and ethylene oxide- and propylene oxide-modified products thereof can improve hardness of a cured product, and are preferable.

The $ZrO_2$ dispersion liquid of the present invention can contain the coated $ZrO_2$ particle in an amount of preferably 12 mass % or more and 90 mass % or less, more preferably 22 mass % or more and 90 mass % or less, further preferably 28 mass % or more and 90 mass % or less, furthermore preferably 28 mass % or more and 85 mass % or less and furthermore preferably 28 mass % or more and 60 mass % or less. When the content of the coated $ZrO_2$ particle is 90 mass % or less, a moderate interparticle distance is ensured, and a difficulty level for uniformly dispersing the coated $ZrO_2$ particle is reduced. When the content of the coated $ZrO_2$ particle is 12 mass % or more, a sufficient amount of the coated $ZrO_2$ particle is present in the $ZrO_2$ dispersion liquid, and thus, properties as a $ZrO_2$ dispersion liquid can be expressed, and operability and transportation efficiency of the $ZrO_2$ dispersion liquid are improved.

The $ZrO_2$ dispersion liquid of the present invention can contain the dispersion medium in an amount of preferably 10 mass % or more and 80 mass % or less, more preferably 15 mass % or more and 75 mass % or less, further preferably 15 mass % or more and 70 mass % or less, furthermore preferably 25 mass % or more and 70 mass % or less and furthermore preferably 40 mass % or more and 70 mass % or less. The contents of the coated $ZrO_2$ particle and the dispersion medium in the $ZrO_2$ dispersion liquid of the present invention can be adjusted by volatilizing the dispersion medium from the $ZrO_2$ dispersion liquid after the silane coupling reaction or mixing the dispersion medium thereto such that the content of the dispersion medium in the $ZrO_2$ dispersion liquid falls within the above range.

In the $ZrO_2$ dispersion liquid of the present invention, the BET specific surface area of the $ZrO_2$ particle coated with the silane coupling agent obtained by removing the dispersion medium from the mixture after the $ZrO_2$ particle is reacted with the silane coupling agent is 36% or more, preferably 50% or more, more preferably 55% or more, further preferably 60% or more and furthermore preferably 65% or more of the BET specific surface area of the $ZrO_2$ particle before coating with the silane coupling agent. The proportion of the BET specific surface area of the $ZrO_2$ particle coated with the silane coupling agent to the BET specific surface area of the $ZrO_2$ particle before coating with the silane coupling agent [hereinafter also referred to as a proportion of a post-coating BET specific surface area] falling within this range is effective on stability of the dispersion liquid and compatibility when it is formulated with monomers and others, and has effects on uniformity and transparency when sheets or films are molded using this dispersion liquid. An upper limit thereof is not particularly limited, but may be, for example, 200% or less, further 150% or less and further 100% or less.

In the $ZrO_2$ dispersion liquid of the present invention, the coated $ZrO_2$ particle coated with the silane coupling agent contained in the $ZrO_2$ dispersion liquid may be obtained in such a manner that the uncoated $ZrO_2$ particle and the silane coupling agent are mixed such that a theoretical surface coating rate of the silane coupling agent on the uncoated $ZrO_2$ particle (hereinafter referred to as a theoretical surface coating rate) is preferably 5% or more and 100% or less, more preferably 10% or more and 80% or less and further preferably 20% or more and 70% or less, and the uncoated $ZrO_2$ particle is reacted with the silane coupling agent. If the uncoated $ZrO_2$ particle and the silane coupling agent are mixed at a theoretical surface coating rate falling within the above range and the uncoated $ZrO_2$ particle is coated with the silane coupling agent, it is possible to effectively impart functions of the silane coupling agent to the particle surface of the uncoated $ZrO_2$ particle, suppress increase in the silane coupling agent unreacted, and attain improvements in functions derived from $ZrO_2$ particles such as an improvement in a refractive index of a composition containing the coated $ZrO_2$ particle and others.

The theoretical surface coating rate is a proportion of a mass of the silane coupling agent used to a minimum mass of the silane coupling agent required for completely coating the particle surface of the uncoated $ZrO_2$ particle [hereinafter referred to as a required amount of the silane coupling agent], and is determined by the following formula (1):

$$\text{theoretical surface coating rate (\%)} = [(\text{mass of silane coupling agent used})/(\text{required amount of silane coupling agent})] \times 100 \quad (1)$$

The above required amount of the silane coupling agent (g) can be determined from a value of the BET specific surface area of the uncoated $ZrO_2$ particle and a minimum coating area of the silane coupling agent ($m^2/g$) on the basis of the following formula (2):

$$\text{required amount of silane coupling agent (g)} = [(TA) \times (SSA)]/(MCA) \quad (2)$$

TA: amount of uncoated $ZrO_2$ particle (g)
SSA: BET specific surface area of uncoated $ZrO_2$ particle ($m^2/g$)
MCA: minimum coating area of silane coupling agent ($m^2/g$)

$$MCA = (6.02 \times 10^{23} \times 13 \times 10^{-20})/(\text{molecular weight of silane coupling agent})$$

In the $ZrO_2$ dispersion liquid of the present invention, a median diameter of the coated $ZrO_2$ particle is equal to or greater than an average particle size of the uncoated $ZrO_2$ particle, and is preferably 1 time or more and 3 times or less, more preferably 1 time or more and 2 times or less and further preferably 1 time or more and 1.5 times or less the average primary particle size of the uncoated $ZrO_2$ particle. The closer the median diameter of the coated $ZrO_2$ particle is to the average primary particle size of the uncoated $ZrO_2$ particle, the more dispersed it is. A particle size of the coated $ZrO_2$ particle is a value measured by a dynamic light scattering particle size distribution measurement device.

The $ZrO_2$ dispersion liquid of the present invention may optionally contain a dispersant. While the dispersant is not particularly limited unless it impairs the original dispersibility of the dispersion liquid, examples include an anionic dispersant such as an acrylic acid-based dispersant, a carboxylic acid-based dispersant, a phosphoric acid-based dispersant, a sulfonic acid-based dispersant or the like. The dispersant may be, for example, an anionic dispersant having an acid radical such as a carboxylic acid or phosphoric acid or a salt of these or the like.

The $ZrO_2$ dispersion liquid of the present invention can contain the dispersant in an amount of preferably 0.5 mass % or more and 20.0 mass % or less and more preferably 0.5 mass % or more and 10.0 mass % or less relative to the uncoated $ZrO_2$ particle. If the content of the dispersant is 0.5 mass % or more, dispersion stability of the coated $ZrO_2$ particle is improved. If the content of the dispersant is 20.0 mass % or less, properties of the $ZrO_2$ dispersion liquid are maintained, and degradations in functions derived from $ZrO_2$ particles such as a high refractive index and others are suppressed to a minimum.

The $ZrO_2$ dispersion liquid of the present invention can optionally contain a photosensitizer, a leveling agent, a surfactant, a defoamer, a neutralizer, an antioxidant, a mold release agent, a UV absorber or the like.

Here, the silane coupling agent to be reacted with the $ZrO_2$ particle is explained.

Examples of the silane coupling agent can include the following, but are not limited thereto. Either a single silane coupling agent or a combination of multiple silane coupling agents can be used.

Examples of the silane coupling agent include a silane coupling agent having an alkoxy group or a silane coupling agent having no alkoxy group. The silane coupling agent having an alkoxy group is preferably methoxysilane from the viewpoint of reactivity. The silane coupling agent having no alkoxy group is preferably a silazane which quickly reacts as it does not need to be hydrolyzed.

As the silane coupling agent, for example, a methacryloxy-based silane coupling agent, an acryloxy-based silane coupling agent, a hydrocarbon-based silane coupling agent, a vinyl-based silane coupling agent, an epoxy-based silane coupling agent, an amino-based silane coupling agent, an ureide-based silane coupling agent or the like can be used.

Examples of the methacryloxy-based silane coupling agent include 3-methacryloxypropyltrimethylsilane, 3-methacryloxypropylmethyldimethoxysilane, 3-methacryloxypropyltrimethoxysilane, 3-methacryloxypropylmethyldiethoxysilane or 3-methacryloxypropyltriethoxy silane.

Examples of the acryloxy-based silane coupling agent include 3-acryloxypropyltrimethylsilane, 3-acryloxypropylmethyldimethoxysilane, 3-acryloxypropyltrimethoxysilane, 3-acryloxypropylmethyldiethoxysilane or 3-acryloxypropyltriethoxysilane.

Examples of the hydrocarbon-based silane coupling agent include methyltrimethoxysilane, n-propyltrimethoxysilane, hexyltrimethoxysilane, decyltrimethoxysilane, isobutyltrimethoxysilane, phenyltrimethoxysilane, diphenyldimethoxysilane, hexamethyldisilazane or chlorotrimethylsilane.

Examples of the vinyl-based silane coupling agent include allyltrichlorosilane, allyltriethoxysilane, allyltrimethoxysilane, diethoxymethylvinylsilane, trichlorovinylsilane, vinyltrichlorosilane, vinyltrimethoxysilane, vinyltriethoxysilane or vinyltris(2-methoxyethoxy) silane.

Examples of the epoxy-based silane coupling agent include diethoxy (glycidyloxypropyl)methylsilane, 2-(3,4 epoxycyclohexyl)ethyltrimethoxysilane, 3-glycidoxypropyltrimethoxysilane, 3-glycidoxypropylmethyldiethoxysilane or 3-glycidoxypropyltriethoxysilane. Examples of a styrene-based silane coupling agent include p-styryltrimethoxysilane.

Examples of the amino-based silane coupling agent include N-2 (aminoethyl) 3-aminopropylmethyldimethoxysilane, N-2 (aminoethyl) 3-aminopropyltrimethoxysilane, N-2 (aminoethyl) 3-aminopropyltriethoxysilane, 3-aminopropyltrimethoxysilane, 3-aminopropyltriethoxysilane, 3-triethoxysilyl-N-(1,3-dimethyl-butylidene) propylamine or N-phenyl-3-aminopropyltrimethoxysilane.

Examples of the ureide-based silane coupling agent include 3-ureidopropyltriethoxysilane.

Examples of still another silane coupling agent include the following. Examples include 3-chloropropyltrimethoxysilane as a chloropropyl-based silane coupling agent. Examples include 3-mercaptopropylmethyldimethoxysilane or 3-mercaptopropyltrimethoxysilane as a mercapto-based silane coupling agent. Examples include bis(triethoxysilylpropyl)tetrasulfide as a sulfide-based silane coupling agent. Examples include 3-isocyanatepropyltriethoxysilane as an isocyanate-based silane coupling agent. Examples include 3,3,3-trifluoropropyltrimethoxysilane as a fluorine-based silane coupling agent.

Note that, in the present invention, another coupling agent may be optionally used. Examples of another coupling agent include an aluminum-based coupling agent. Examples of the aluminum-based coupling agent include an acetoalkoxyaluminum diisopropylate.

The silane coupling agent is preferably 3-methacryloxypropyltrimethoxysilane, 3-acryloxypropyltrimethoxysilane, vinyltrimethoxysilane, 3-aminopropyltrimethoxysilane, 3-glycidoxypropyltrimethoxysilane or 3-mercaptopropyltrimethoxysilane which can be chemically bonded to monomers or resins. Further, the silane coupling agent is preferably phenyltrimethoxysilane, hexyltrimethoxysilane, isobutyltrimethoxysilane, 3,3,3-trifluoropropyltrimethoxysilane or hexamethyldisilazane which has good compatibility with low-polarity monomers or resins.

The $ZrO_2$ dispersion liquid of the present invention can be used for various applications such as display materials such as an index matching film, a prism sheet, an anti-reflective film and others, optical materials such as a hard coating agent and a primer for eyeglass lenses and others, electronic component materials such as a piezoelectric element and others, dental materials such as a dental adhesive and filler and others, or the like. It is possible to impart functions derived from $ZrO_2$ such as a high refractive index, hardness, X-ray contrast properties and others while maintaining transparency of resins and others formulated with the coated $ZrO_2$ particle.

The $ZrO_2$ dispersion liquid of the present invention may be, for example, a $ZrO_2$ dispersion liquid for use in coating agents and further for use in primers.

<Method for Producing $ZrO_2$ Dispersion Liquid>

The present invention provides a method for producing a $ZrO_2$ dispersion liquid containing a $ZrO_2$ particle coated with a silane coupling agent, including: mixing the $ZrO_2$ particle with a dispersion medium for the $ZrO_2$ particle; and reacting the $ZrO_2$ particle with the silane coupling agent in the obtained mixture, wherein the reaction of the $ZrO_2$ particle with the silane coupling agent is carried out until a BET specific surface area of the $ZrO_2$ particle coated with the silane coupling agent obtained by removing the dispersion medium from the mixture during the reaction reaches 36% or more of a BET specific surface area of the $ZrO_2$ particle before coating with the silane coupling agent.

The method for producing a $ZrO_2$ dispersion liquid of the present invention may be the method for producing a $ZrO_2$ dispersion liquid, wherein the reaction of the $ZrO_2$ particle with the silane coupling agent is stopped when the BET specific surface area of the $ZrO_2$ particle coated with the silane coupling agent obtained by removing the dispersion medium from the mixture after the $ZrO_2$ particle is reacted with the silane coupling agent reaches 36% or more of the BET specific surface area of the $ZrO_2$ particle before coating with the silane coupling agent.

In the method for producing a $ZrO_2$ dispersion liquid of the present invention, the $ZrO_2$ particle, the dispersion medium and the silane coupling agent stated in the above $ZrO_2$ dispersion liquid of the present invention can be preferably used. Further, a preferable proportion of the post-coating BET specific surface area is also the same as in the case of the $ZrO_2$ dispersion liquid of the present invention. In other words, the method for producing a $ZrO_2$ dispersion liquid of the present invention may be the method for producing a $ZrO_2$ dispersion liquid, wherein the reaction of the $ZrO_2$ particle with the silane coupling agent is carried out until the preferable proportion of the post-coating BET specific surface area described in the $ZrO_2$ dispersion liquid is reached. Further, the method for producing a $ZrO_2$ dispersion liquid of the present invention may be the method for producing a $ZrO_2$ dispersion liquid, wherein the reaction of the $Zro_2$ particle with the silane coupling agent is stopped when the preferable proportion of the post-coating BET specific surface area described in the $ZrO_2$ dispersion liquid is reached.

In the method for producing a $ZrO_2$ dispersion liquid of the present invention, first, the $ZrO_2$ particle is mixed with the dispersion medium for the $ZrO_2$ particle, and the $ZrO_2$ particle is reacted with the silane coupling agent in this mixture. The silane coupling agent has only to be contained in this mixture, and for example, may be mixed in advance to the dispersion medium or may be mixed to the mixture of the dispersion medium and the uncoated $ZrO_2$ particle. In other words, the method for producing a $ZrO_2$ dispersion liquid of the present invention may be the method for producing a $ZrO_2$ dispersion liquid, wherein the $ZrO_2$ particle, the dispersion medium for the $ZrO_2$ particle and the silane coupling agent are mixed, and the $ZrO_2$ particle is reacted with the silane coupling agent in the mixture.

In the method for producing a $ZrO_2$ dispersion liquid of the present invention, the $ZrO_2$ particle is preferably reacted with the silane coupling agent by a wet process. "Being reacted by a wet process" is as stated in the above $ZrO_2$ dispersion liquid of the present invention.

A mixing amount of the uncoated $ZrO_2$ particle is preferably 10 mass % or more and 80 mass % or less, more preferably 20 mass % or more and 80 mass % or less, further preferably 25 mass % or more and 80 mass % or less, furthermore preferably 25 mass % or more and 70 mass % or less and furthermore preferably 25 mass % or more and 50 mass % or less relative to a total amount of mixed components. When the mixing amount of the uncoated $ZrO_2$ particle is 80 mass % or less, a moderate interparticle distance is maintained, and thus, a dispersion difficulty level can be reduced. When the mixing amount of the uncoated $ZrO_2$ particle is 10 mass % or more, a sufficient amount of the coated $ZrO_2$ particle is present in the $ZrO_2$ dispersion liquid, and thus, properties as a $ZrO_2$ dispersion liquid can be expressed, and operability and transportation efficiency of the $ZrO_2$ dispersion liquid are improved.

A mixing amount of the dispersion medium may be preferably more than 10 mass % and 80 mass % or less, more preferably 20 mass % or more and 70 mass % or less and further preferably 30 mass % or more and 70 mass % or less relative to the total amount of the mixed components.

The silane coupling agent can be mixed to the uncoated $ZrO_2$ particle such that a theoretical surface coating rate of the silane coupling agent on the uncoated $ZrO_2$ particle is preferably 5% or more and 100% or less, more preferably 10% or more and 80% or less and further preferably 20% or more and 70% or less. The theoretical surface coating rate is a proportion of a mass of the silane coupling agent used to a minimum mass of the silane coupling agent required for completely coating the particle surface of the uncoated $ZrO_2$ particle, and is determined by the above formulas (1) and (2). If the silane coupling agent and the uncoated $ZrO_2$ particle are mixed such that the theoretical surface coating rate falls within the above range, it is possible to effectively impart functions of the silane coupling agent to the particle surface of the $ZrO_2$ particle powder, suppress increase in the silane coupling agent unreacted, and attain improvements in functions derived from $ZrO_2$ particles such as an improvement in a refractive index of a composition containing the $ZrO_2$ particle and others.

When the reaction with the silane coupling agent is carried out, water may be added into the mixture. A mixing amount of water is, for example, 1 time or more and 5 times or less, preferably 1 time or more and 4 times or less and more preferably 1 time or more and 3 times or less a water amount required for hydrolyzing the silane coupling agent. In the water amount adjustment, water in the air or water remaining in the dispersion medium may be taken into consideration. Further, a catalyst which accelerates the reaction of the $ZrO_2$ particle with the silane coupling agent can be mixed to the mixture. In other word, the mixture contains a catalyst, and the $ZrO_2$ particle can be reacted with the silane coupling agent in the presence of the catalyst.

Examples of the catalyst include inorganic acids such as hydrochloric acid, sulfuric acid and others, organic acids such as acetic acid and others, inorganic bases such as sodium hydroxide, potassium hydroxide and others or organic bases such as triethylamine and others. Either a single catalyst or a combination of multiple catalysts can be used.

An amount of the catalyst is not particularly limited as long as it enables the $ZrO_2$ particle to be sufficiently reacted with the silane coupling agent, but is preferably 0.1 mass % or more and 5.0 mass % or less, more preferably 0.1 mass % or more and 2.0 mass % or less and further preferably 0.1 mass % or more and 0.5 mass % or less relative to the uncoated $ZrO_2$ particle. If the amount of the catalyst is 0.1 mass % or more, reactivity of the silane coupling agent can be further increased, and if the amount of the catalyst is 5.0 mass % or less, the $ZrO_2$ particle can be reacted with the silane coupling agent without any effects on properties of the $ZrO_2$ dispersion liquid or the curable composition containing the $ZrO_2$ dispersion liquid.

A reaction temperature of the $ZrO_2$ particle and the silane coupling agent is not particularly limited as long as it enables the silane coupling agent to be sufficiently reacted and does not cause volatilization of the dispersion medium, but is preferably 10° C. or more and 100° C. or less, more preferably 15° C. or more and 80° C. or less and further preferably 20° C. or more and 70° C. or less. During this reaction, the mixture may be dispersed or stirred with a media-type dispersing machine such as a bead mill or the like or with a stirring machine such as a mechanical stirrer or the like.

A reaction time of the $ZrO_2$ particle and the silane coupling agent is not particularly limited as long as it enables the silane coupling agent to be sufficiently reacted and does not cause volatilization of the dispersion medium, but is preferably 1 hour or more and 24 hours or less, more preferably 1 hour or more and 12 hours or less and further preferably 1 hour or more and 6 hours or less.

In the production of a $ZrO_2$ dispersion liquid, a dispersant and any other optional components listed in the explanation of the $ZrO_2$ dispersion liquid can be mixed. When these optional components are mixed, they are mixed after the reaction with the silane coupling agent.

When a dispersant is mixed in the production of a $ZrO_2$ dispersion liquid, a mixing amount of the dispersant is preferably 0.5 mass % or more and 20.0 mass % or less and more preferably 0.5 mass % or more and 10.0 mass % or less relative to the mixing amount of the uncoated $ZrO_2$ particle.

The method for producing a $ZrO_2$ dispersion liquid of the present invention makes it possible to obtain a $ZrO_2$ dispersion liquid containing a $ZrO_2$ particle coated with a silane coupling agent and a dispersion medium for the $ZrO_2$ particle, wherein a BET specific surface area of the $ZrO_2$ particle coated with the silane coupling agent obtained by removing the dispersion medium is 36% or more of a BET specific surface area of the $ZrO_2$ particle before coating with the silane coupling agent.

The method for producing a $ZrO_2$ dispersion liquid of the present invention may be a method for producing a $ZrO_2$ dispersion liquid, including: mixing a $ZrO_2$ particle with a dispersion medium for the $ZrO_2$ particle; and reacting the $ZrO_2$ particle with a silane coupling agent in the obtained mixture, wherein in the reaction of the $ZrO_2$ particle with the silane coupling agent, a BET specific surface area of the $ZrO_2$ particle during the reaction is monitored, and the reaction of the $ZrO_2$ particle with the silane coupling agent is carried out until a BET specific surface area of the $ZrO_2$ particle coated with the silane coupling agent obtained by removing the dispersion medium from the mixture reaches 36% or more of a BET specific surface area of the $ZrO_2$ particle before coating with the silane coupling agent.

The $ZrO_2$ dispersion liquid may be a $ZrO_2$ dispersion liquid containing the dispersion medium used during the production of the $ZrO_2$ dispersion liquid. Further, the $ZrO_2$ dispersion liquid may be a $ZrO_2$ dispersion liquid obtained in such a manner that the dispersion medium for the $ZrO_2$ particle used during the reaction of the $ZrO_2$ particle with the silane coupling agent is removed, and powder containing the coated $ZrO_2$ particle is dispersed in another dispersion medium. As the dispersion media, any dispersion media shown in the above $ZrO_2$ dispersion liquid can be preferably used.

<Method for Measuring BET Specific Surface Area of Coated $ZrO_2$ Particle>

The BET specific surface area of the coated $ZrO_2$ particle can be measured by the above method in accordance with JIS Z-8830.

For example, a required amount of the $ZrO_2$ dispersion liquid of the present invention is separated, and subjected to vacuum drying under the conditions of 60 to 100° C. and 10 to 15 hours to remove the dispersion medium from the $ZrO_2$ dispersion liquid, thus obtaining powder of the coated $ZrO_2$ particle. Subsequently, the powder is ground in a mortar or the like to a degree that it passes through a sieve with a mesh opening of 150 μm. After 30 minutes of preheat at 150° C. is performed for the purpose of removing a remaining solvent or water, a BET specific surface area of the powder of the coated $ZrO_2$ particle is measured by the above BET specific surface area measurement method.

Further, the proportion of the post-coating BET specific surface area is calculated on the basis of the following formula (3) from the BET specific surface area [BET (A)] of the $ZrO_2$ particle coated with the silane coupling agent and the BET specific surface area [BET (B)] of the $ZrO_2$ particle before coating with the silane coupling agent (for example, a raw material $ZrO_2$ particle) measured in advance:

$$\text{proportion of post-coating } BET \text{ specific surface area (\%)} = \\ [BET(A)/BET(B)] \times 100 \quad (3)$$

The proportion of the post-coating BET specific surface area is 36% or more, preferably 50% or more, more preferably 55% or more, further preferably 60% or more and furthermore preferably 65% or more, and may be, for example, 200% or less, further 150% or less and further 100% or less.

Note that the above proportion between the BET specific surface areas can also be calculated on the basis of an estimated value of the BET specific surface area of the uncoated $ZrO_2$ particle [i.e., BET (B)], wherein the coated $ZrO_2$ particle contained in the $ZrO_2$ dispersion liquid of the present invention can be brought into contact with an alkali solution such as, for example, a 50 mass % aqueous potassium hydroxide solution and washed therewith and the alkali component can be washed away with water or an alcohol to remove the coating from the coated $ZrO_2$ particle, and a BET specific surface area value of the $ZrO_2$ particle from which the coating has been removed can be measured and used as the estimated value.

Curable Composition

The present invention provides a curable composition containing the above $ZrO_2$ dispersion liquid of the present invention.

The curable composition of the present invention may be a composition containing the $ZrO_2$ dispersion liquid of the present invention and a polymerizable compound.

Further, the curable composition of the present invention may be a composition containing the $ZrO_2$ dispersion liquid of the present invention and a curable resin.

The curable composition of the present invention may be a composition formulated with the $ZrO_2$ dispersion liquid of the present invention. Further, the curable composition of the present invention may be a composition formulated with the $ZrO_2$ dispersion liquid of the present invention and a polymerizable compound.

The preferable aspects of the above $ZrO_2$ dispersion liquid of the present invention can be appropriately applied to the curable composition of the present invention.

The curable composition of the present invention and a cured product thereof can be reduced in haze, and the cured product of the curable composition has improved abrasion resistance or hardness as dispersion stability of the coated $ZrO_2$ particle and compatibility of the $ZrO_2$ dispersion liquid of the present invention with monomers or polymers are increased. Further, variations in properties of the curable composition are also reduced.

In other words, the curable composition of the present invention or the cured product thereof is highly transparent and capable of attaining low haze, high hardness and abrasion resistance, as well as attaining a high refractive index even if $ZrO_2$ particles are dispersed to increase a refractive index. Accordingly, the curable composition of the present invention is suitable for applications such as coating agents, primers and others.

The polymerizable compound in the curable composition of the present invention may be a monomer, an oligomer or a polymer. The monomers stated in the dispersion medium, or the polymerizable compounds described below can be preferably used as the polymerizable compound. The polymerizable compound may be a curable resin or a cross-linkable compound. Hereinafter, the curable composition of the present invention is explained in detail by illustrating its specific applications.

The curable composition of the present invention can be used as, for example, a coating agent. The coating agent may be a coating agent for lenses and further for eyeglass lenses. The coating agent of the present invention may be a hard coating or a primer and further a hard coating for eyeglass lenses or a primer for eyeglass lenses.

The curable composition of the present invention can contain a resin as the polymerizable compound. Examples of types of the resin are not particularly limited and include, for example, a polyurethane-based resin, an epoxy-based resin, a phenol-based resin, a polyimide-based resin, a polyester-based resin, a bismaleimide-based resin and a polyolefin-based resin, and a polyurethane-based resin is preferable. Examples of commercially available polyurethane resins that can be used include, for example, "EVAFANOL" series (manufactured by NICCA CHEMICAL CO., LTD.), "SUPERFLEX" series (manufactured by DKS Co. Ltd.), "ADEKA BONTIGHTER" series (manufactured by ADEKA CORPORATION), "OLESTER" series (manufactured by Mitsui Chemicals, Inc.), "VONDIC" series (manufactured by DIC Corporation), "HYDRAN" series (manufactured by DIC Corporation), "SOFLANATE" series (manufactured by Nihon Soflan Chemical & Engineering Co., Ltd.), "POIZ" series (manufactured by Kao Corporation), "SANPRENE" series (manufactured by Sanyo Chemical Industries, Ltd.), "AIZELAX" series (manufactured by Hodogaya Chemical Co., Ltd.), "NeoRez" series (manufactured by Zeneca Resins) and others. The curable composition containing these resins can be suitably used for, for example, primers for eyeglass lenses. Note that the curable composition of the present invention may contain a publicly-known compound constituting a primer layer.

The curable composition of the present invention can contain a UV-curable polymerizable compound. This curable composition can be used as, for example, a hard coating agent. Examples of the UV-curable polymerizable compound include, for example, polyfunctional acrylates as typified by dipentaerythritol hexaacrylate (DPHA, manufactured by DAICEL-ALLNEX LTD.) and trimethylolpropane triacrylate (trade name: NK ESTER A-TMPT, manufactured by SHIN-NAKAMURA CHEMICAL CO, LTD.).

Further, the curable composition of the present invention can contain a thermosetting polymerizable compound. This curable composition can be used as, for example, a hard coating agent. As the thermosetting polymerizable compound, hydrolyzable group-containing organic silicon compounds typified by tetraethoxysilane (TEOS) and 3-glycidoxypropyltrimethoxysilane (trade name: KBM-403, manufactured by Shin-Etsu Chemical Co., Ltd.), polyfunctional epoxy compounds containing two or more epoxy groups such as trimethylolpropane triglycidyl ether (TMPTGE, trade name: Epolight 100MF, manufactured by KYOEISHA CHEMICAL Co., LTD.), glycerol polyglycidyl ether (trade name: DENACOL EX-313, manufactured by Nagase ChemteX Corporation) and others, or the like can be preferably used. Further, epoxy compounds are also used for adhesives and others, and can also be applied to attaining high refractive indices of adhesives.

The curable composition of the present invention can contain a monomer containing an aromatic ring, such as ethoxylated o-phenylphenol acrylate (OPPA, trade name: NK ESTER A-LEN-10, manufactured by SHIN-NAKAMURA CHEMICAL CO, LTD.), 3-phenoxybenzyl acrylate (trade name: Light Acrylate POB-A, manufactured by KYOEISHA CHEMICAL Co., LTD.), bisphenol fluorene diacrylate (trade name: OGSOL EA-F5710, manufactured by Osaka Gas Chemicals Co., Ltd.) or the like as the polymerizable compound. This curable composition is suitable as, for example, a high-refractive-index material for displays and others.

The curable composition of the present invention can contain dimethacrylates such as urethane dimethacrylate (UDMA), bisphenol A diglycidyl methacrylate (Bis-GMA) and triethylene glycol dimethacrylate (TEGDMA) and others as the polymerizable compound. This curable composition is suitable as a dental restorative agent such as, for example, a filler (composite resin), an adhesive (resin cement), a resin material for cutting processing (hybrid resin block) or the like, to which high translucency, high strength and x-ray contrast properties are imparted.

Note that the $ZrO_2$ dispersion liquid of the present invention can also be used as a strengthening agent to increase mechanical strength of sintered or semi-sintered zirconia. In other words, the present invention can provide an all-ceramic crown restoration or the like with improved mechanical strength, and is suitable as such a zirconia strengthening agent.

The $ZrO_2$ dispersion liquid of the present invention includes such a strengthening agent for sintered or semi-sintered zirconia.

A content of the coated $ZrO_2$ particle or a content of the polymerizable compound in the curable composition of the present invention is appropriately selected according to the applications of the curable composition or the functions to be imparted. The $ZrO_2$ dispersion liquid and the polymerizable compound are mixed such that the content of the coated $ZrO_2$ particle and the content of the polymerizable compound fall within predetermined ranges appropriate for each application.

For example, when the curable composition is used for eyeglass primer applications, the curable composition of the present invention can contain the coated $ZrO_2$ particle in an amount of preferably 1 mass % or more and 80 mass % or less, more preferably 2 mass % or more and 70 mass % or less, further preferably 4 mass % or more and 60 mass % or less, furthermore preferably 4 mass % or more and 40 mass % or less and furthermore preferably 4 mass % or more and 20 mass % or less from the viewpoint of adjusting a refractive index. When the content of the coated $ZrO_2$ particle in the composition is 1 masse or more, a refractive index adjustment effect can be achieved. Further, when the content of the coated $ZrO_2$ particle in the composition is 80 mass % or less, excellent impact resistance is attained, and fogging due to light scattering can be suppressed.

Further, when the curable composition is used for eyeglass primer applications, the curable composition of the present invention can contain the polymerizable compound in an amount of preferably 20 mass % or more and 99 mass % or less, more preferably 30 mass % or more and 98 mass % or less, further preferably 40 mass % or more and 96 mass % or less, furthermore preferably 60 mass % or more and 96 mass % or less and furthermore preferably 80 mass % or more and 96 mass % or less from the viewpoint of impact resistance.

Further, for example, when the curable composition is used for hard coating applications, the curable composition of the present invention can contain the coated $ZrO_2$ particle in an amount of preferably 10 mass % or more and 95 mass % or less, more preferably 10 mass % or more and 90 mass % or less, further preferably 10 mass % or more and 80 mass % or less, furthermore preferably 15 mass % or more and 75 mass % or less and furthermore preferably 20 mass % or more and 70 mass % or less from the viewpoints of high hardness and abrasion resistance. When the content of the coated $ZrO_2$ particle in the composition is 10 mass % or more, a hardness improvement effect is more likely to be obtained, and when it is 95 mass % or less, excellent dispersion stability of the coated $ZrO_2$ particle is attained.

Further, when the curable composition is used for hard coating applications, the curable composition of the present invention can contain the polymerizable compound in an amount of preferably 5 mass % or more and 90 mass % or less, more preferably 10 mass % or more and 90 mass % or less, further preferably 20 mass % or more and 90 mass % or less, furthermore preferably 25 mass % or more and 85 mass % or less and furthermore preferably 30 mass % or more and 80 mass % or less from the viewpoints of high hardness and abrasion resistance.

Further, for example, when the curable composition is used for high-refractive-index material applications such as for displays and others, the curable composition of the present invention can contain the coated $ZrO_2$ particle in an amount of preferably 20 mass % or more and 95 mass % or less, more preferably 20 mass % or more and 90 mass % or less, further preferably 30 mass % or more and 90 mass % or less, furthermore preferably 40 mass % or more and 90 mass % or less, furthermore preferably 40 mass % or more and 75 mass % or less and furthermore preferably 40 mass % or more and 60 mass % or less from the viewpoint of attaining a high refractive index. When the content of the coated $ZrO_2$ particle in the composition is 20 mass % or more, a refractive index adjustment effect can be achieved. Further, when the content of the coated $ZrO_2$ particle in the composition is 95 mass % or less, fogging due to light scattering can be suppressed.

Further, when the curable composition is used for high-refractive-index material applications such as for displays and others, the curable composition of the present invention can contain the polymerizable compound in an amount of preferably 5 mass % or more and 80 mass % or less, more preferably 10 mass % or more and 80 mass % or less, further preferably 10 mass % or more and 70 mass % or less, furthermore preferably 10 mass % or more and 60 mass % or less, furthermore preferably 25 mass % or more and 60 mass % or less and furthermore preferably 40 mass % or more and 60 mass % or less from the viewpoint of attaining a high refractive index.

Further, for example, when the curable composition is used for dental material applications, the curable composition of the present invention can contain the coated $ZrO_2$ particle in an amount of preferably 10 mass % or more and 95 mass % or less, more preferably 10 mass % or more and 90 mass % or less, further preferably 15 mass % or more and 90 mass % or less, furthermore preferably 20 mass % or more and 90 mass % or less, furthermore preferably 30 mass % or more and 70 mass % or less and furthermore preferably 40 mass& or more and 60 mass % or less from the viewpoint of mechanical strength.

Further, when the curable composition is used for dental material applications, the curable composition of the present invention can contain the polymerizable compound in an amount of preferably 5 mass % or more and 90 mass % or less, more preferably 10 mass % or more and 90 mass % or less, further preferably 10 mass % or more and 85 mass % or less, furthermore preferably 10 mass % or more and 80 mass % or less, furthermore preferably 30 mass % or more and 70 mass % or less and furthermore preferably 40 mass % or more and 60 mass % or less from the viewpoint of mechanical strength.

Method for Evaluating $ZrO_2$ Dispersion Liquid

The present invention provides a method for evaluating a $ZrO_2$ dispersion liquid containing a $ZrO_2$ particle coated with a silane coupling agent and a dispersion medium for the $ZrO_2$ particle, including:
preparing a predetermined amount of a sample of the $ZrO_2$ dispersion liquid;
removing the dispersion medium from the sample of the $ZrO_2$ dispersion liquid;
measuring a BET specific surface area of the $ZrO_2$ particle coated with the silane coupling agent obtained by removing the dispersion medium from the sample of the $ZrO_2$ dispersion liquid; and
determining that the $ZrO_2$ dispersion liquid is usable when the BET specific surface area is 36% or more of a BET specific surface area of the $ZrO_2$ particle before coating with the silane coupling agent, or determining that the $ZrO_2$ dispersion liquid is unusable when the BET specific surface area is less than 36% thereof.

The method for evaluating a $ZrO_2$ dispersion liquid of the present invention may be the method for evaluating a $ZrO_2$ dispersion liquid, wherein the $ZrO_2$ particle is mixed with the dispersion medium for the $ZrO_2$ particle, the $ZrO_2$ dispersion liquid is produced in the mixture, and the sample is prepared from the $ZrO_2$ dispersion liquid.

In the method for evaluating a $ZrO_2$ dispersion liquid of the present invention, the uncoated $ZrO_2$ particle, the dispersion medium and the silane coupling agent stated in the above $ZrO_2$ dispersion liquid of the present invention can be preferably used. Further, the BET specific surface areas of the uncoated $ZrO_2$ particle and the coated $ZrO_2$ particle can be measured by the same method as the method stated in the $ZrO_2$ dispersion liquid of the present invention and the method for producing a $ZrO_2$ dispersion liquid of the present invention.

The proportion of the BET specific surface area of the coated $ZrO_2$ particle to the BET specific surface area of the uncoated $ZrO_2$ particle, which is an evaluation criterion for a $ZrO_2$ dispersion liquid, is 36% or more, preferably 50% or more, more preferably 55% or more, further preferably 60% or more and furthermore preferably 65% or more, and may be, for example, 200% or less, further 150% or less and further 100% or less. This proportion can be calculated on the basis of the above formula (3).

EXAMPLES (1) Method for Producing $ZrO_2$ Dispersion Liquid

Examples 1-1 to 1-3 and Comparative Examples 1-1 to 1-3

180.0 g of a $ZrO_2$ particle having an average particle size of 10 nm and a BET specific surface area of 145 $m^2/g$ (manufactured by Kanto Denka Kogyo Co., Ltd.) was mixed with 374.0 g of methyl ethyl ketone (MEK), 41.6 g of 3-methacryloxypropyltrimethoxysilane (trade name: KBM-503, manufactured by Shin-Etsu Chemical Co., Ltd.), 1.5 g of water and 0.45 g of triethylamine, and coarsely dispersed with a dispersing and stirring machine. The mixed liquid obtained by stirring was dispersed at 50° C. or less using a bead mill apparatus, a media-type dispersing machine. A BET specific surface area of the $ZrO_2$ particle in the mixed liquid was measured on the basis of the method described in (4) below, and a reaction process of the $ZrO_2$ particle with the silane coupling agent was ended when it was confirmed that the BET specific surface area of the coated $ZrO_2$ particle was a predetermined BET specific surface area. MEK was added to a resulting liquid to perform a concentration adjustment to make a $ZrO_2$ concentration 30 mass %, thus obtaining a $ZrO_2$ dispersion liquid.

Example 1-4

In example 1-4, a $ZrO_2$ dispersion liquid was produced by the same method as in the above example 1-1, provided that MEK was mixed in an amount of 311.0 g, and 3-methacryloxypropyltrimethoxysilane was mixed in an amount of 49.9 g.

Example 1-5

In example 1-5, a $ZrO_2$ dispersion liquid was produced by the same method as in the above example 1-1, provided that MEK was mixed in an amount of 326.0 g, and 24.9 g of 3-methacryloxypropyltrimethoxysilane and 9.9 g of phenyltrimethoxysilane were used instead of 3-methacryloxypropyltrimethoxysilane.

Example 1-6

In example 1-6, a $ZrO_2$ dispersion liquid was produced by the same method as in the above example 1-1, provided that MEK was mixed in an amount of 323.0 g, and 24.9 g of 3-acryloxypropyltrimethoxysilane and 9.9 g of 3,3,3-trifluoropropyltrimethoxysilane were used instead of 3-methacryloxypropyltrimethoxysilane.

<Comparative Example 1-4> (Dry Process)

180.0 g of the fine $ZrO_2$ particle having an average particle size of 10 nm and a BET specific surface area of 145 $m^2/g$, 41.6 g of 3-methacryloxypropyltrimethoxysilane, 1.5 g of water and 0.45 g of triethylamine were mixed and put into a planetary ball mill, and mixed and stirred for 60 minutes. Resulting powder was heated at 100° C. and ground in a mortar to obtain coated $ZrO_2$ powder. MEK was added to the obtained powder to make a concentration of $ZrO_2$ 30 mass %, and the powder was coarsely dispersed with a dispersing and stirring machine. The liquid obtained by stirring was subjected to a dispersion process using a bead mill apparatus, a media-type dispersing machine, and the dispersion process was ended at the timing when the highest transmittance of the dispersion liquid was reached. MEK was added to a resulting liquid to perform a concentration adjustment again to make a $ZrO_2$ concentration 30 mass %, thus obtaining a $ZrO_2$ dispersion liquid.

(2) Preparation of Coated $ZrO_2$ Particle/Monomer-Mixed Paint and Paint Film

For each $ZrO_2$ dispersion liquid produced in the above (1), mixed paints were obtained by mixing the $ZrO_2$ dispersion liquid, MEK, any one of the monomers below and 1-hydroxycyclohexyl phenyl ketone, which is a polymerization initiator. The formulation ratio (mass ratio) of $ZrO_2$ to each monomer was 1:1, an amount of the polymerization initiator was 5 mass % relative to an amount of the nonvolatile components ($ZrO_2$+monomer), and a concentration of the nonvolatile components was adjusted to 30 mass % with MEK. Note that, for the $ZrO_2$ dispersion liquid of example 1-1, mixed paints that the formulation ratios (mass ratios) of $ZrO_2$ to each monomer were 2:8 and 8:2 were also prepared.

DPHA and TMPTGE are polymerizable compounds that can be used respectively for UV-curing hard coating agents and thermosetting hard coating agents, UDMA is a polymerizable compound that can be used for dental materials like composite resins, and OPPA is a polymerizable compound that can be used as a high-refractive-index material for displays and others.

DPHA: dipentaerythritol hexaacrylate, a polyfunctional acrylic monomer
UDMA: urethane dimethacrylate, a bifunctional methacrylic monomer
TMPTGE: trimethylolpropane triglycidyl ether, an epoxy monomer
OPPA: ethoxylated o-phenylphenol acrylate, a methacrylic monomer containing an aromatic ring (3) Method for Measuring Haze The mixed paints prepared in the above (2) were each applied to a glass plate such that the wet film thickness (wet film thickness) was 15 μm (for DPHA and OPPA) or 300 μm (for UDMA and TMPTGE), then dried at 60° C. for 1 minute to remove MEK, and cured using a high-pressure mercury lamp (Handy Cure 100, manufactured by SEN LIGHTS Co., Ltd.), thus preparing mixed paint films. Haze of each obtained paint film was measured using a haze meter (NDH-2000) manufactured by NIPPON DENSHOKU INDUSTRIES CO., LTD. The haze was measured at three locations in the paint film, and the average value thereof was used to evaluate transparency of the paint film.

(4) Method for Measuring BET Specific Surface Area

A required amount of each $ZrO_2$ dispersion liquid was separated, and subjected to vacuum drying at 80° C. for 12 hours, and resulting powder was ground in a mortar to a degree that it passed through a sieve with a mesh opening of 150 μm. Using resulting $ZrO_2$ powder, and using a fully automatic BET specific surface area measurement device (Macsorb HM Model-1210) manufactured by MOUNTECH Co., Ltd., preheat was performed at 150° C. for 30 minutes, and a BET specific surface area was measured by a BET method based on adsorption and desorption of nitrogen gas. The BET specific surface area was measured at three locations, and the average value thereof was used.

(5) Measurement of Transmittance

Each $ZrO_2$ dispersion liquid produced in the above (1) was filled into a glass cell with an optical path length of 1 mm, and a transmittance at a wavelength of 500 nm was measured using a ratio beam-type UV visible spectrophotometer (U-5100) manufactured by Hitachi High-Tech Corporation to evaluate transparency of the dispersion liquid.

(6) Theoretical Surface Coating Rate

The preparation amounts of the silane coupling agents to be mixed with the uncoated $ZrO_2$ particle were determined such that theoretical surface coating rates calculated on the basis of the above formulas (1) and (2) were as shown in the table. A theoretical surface coating rate is a theoretical value when a total amount of a silane coupling agent used forms a monomolecular film on the surface of the $ZrO_2$ particle.

(7) Measurement of Viscosity of $ZrO_2$ Dispersion Liquid

In accordance with JIS Z 8803 (Methods for viscosity measurement of liquid, 9 Viscosity measurement method using single cylindrical rotational viscometer), a predetermined amount of each of the $ZrO_2$ dispersion liquids of examples 1-1 to 1-6 and comparative examples 1-1 to 1-3 was placed in a sample container, and the viscosity of each $ZrO_2$ dispersion liquid at 25° C. was measured using a B-type viscometer (manufactured by Brookfield Corporation, DVIMLVTJ0).

(8) Evaluation of Dispersibility in Another Dispersion Medium

Example 2-1

The $ZrO_2$ dispersion liquid obtained in example 1-1 was dried at 60° C. to remove MEK, and ground in a mortar to obtain coated $ZrO_2$ powder. Methanol (MeOH) was added to the obtained powder to make a concentration of $ZrO_2$ 30 mass %, and the powder was coarsely dispersed with a dispersing and stirring machine. The liquid obtained by stirring was stirred and dispersed using a bead mill apparatus, a media-type dispersing machine, and dispersing was stopped at the timing when the highest transmittance of the dispersion liquid was reached. Methanol was added to a resulting liquid to perform a concentration adjustment again to make a $ZrO_2$ concentration 30 mass %, thus obtaining a $ZrO_2$ dispersion liquid.

Dispersibility evaluations were made on the basis of a transmittance measured as in the above (5) and a particle size distribution measured as in (9) below.

Examples 2-2 to 2-5 and Comparative Example 2-1

In examples 2-2 to 2-5, $ZrO_2$ dispersion liquids were produced by the same method as in the above example 2-1, provided that the dispersion media in Table 2 were used instead of methanol.

Further, in comparative example 2-1, a $ZrO_2$ dispersion liquid was produced by the same method as in the above 2-1, provided that the $ZrO_2$ dispersion liquid of comparative example 1-2 was used instead of the $ZrO_2$ dispersion liquid of example 1-1 and the dispersion medium in Table 2 was used instead of methanol, and dispersibility evaluations were made. Details of the dispersion media in Table 2 were the following.

PGME: propylene glycol monomethyl ether
MEK/IPA: methyl ethyl ketone/isopropyl alcohol (mass ratio)=97:3
PGMEA/IPA: propylene glycol monomethyl ether acetate/isopropyl alcohol (mass ratio)=97:3
PGMEA/MeOH: propylene glycol monomethyl ether acetate/methanol (mass ratio)=85:15

(9) Method for Measuring Particle Size Distribution

A particle size distribution of the particle in each dispersion liquid was measured using a dynamic light scattering particle size distribution measurement device (LB-500) manufactured by HORIBA, Ltd., and a median diameter and a relative standard deviation of the particle size distribution were calculated.

TABLE 1

| | | Example | | | | | | Comparative example | | | |
|---|---|---|---|---|---|---|---|---|---|---|---|
| | | 1-1 | 1-2 | 1-3 | 1-4 | 1-5 | 1-6 | 1-1 | 1-2 | 1-3 | 1-4 |
| Coating process | | Wet process | Wet process | Wet process | Wet process | Wet process | Wet process | Wet process | Wet process | Wet process | Dry process |
| Post-coating BET specific surface area (dry condition) | $m^2/g$ | 106 | 94 | 55 | 84 | 136 | 154 | 32 | 29 | 17 | (36) |
| Proportion of post-coating BET specific surface area to pre-coating BET specific surface area | % | 73.1 | 65 | 38 | 58 | 93 | 106 | 22 | 20.0 | 12 | (24) |
| Silane coupling agent*[1] | | M | M | M | M | M/P | A/TF | M | M | M | M |
| Theoretical surface coating rate | % | 50 | 50 | 50 | 60 | 30/15 | 30/20 | 50 | 50 | 50 | 50 |
| Transmittance of dispersion liquid | % T | >80 | >80 | >80 | >80 | >80 | >80 | >80 | >80 | >80 | <50 Poor stability |
| Median diameter D50 of coated $ZrO_2$ particle in dispersion liquid | nm | 11 | 13 | 15 | 12 | 18 | 17 | 14 | 16 | 14 | 102 |
| Viscosity of $ZrO_2$ dispersion liquid | mPa·s | 1.8 | 1.7 | 1.3 | 4.8 | 2.4 | 2.0 | 1.3 | 1.2 | 1.2 | — Poor stability |
| $ZrO_2$ particle content in curable composition | wt % | 20 | 50 | 80 | 50 | 50 | 50 | 50 | 50 | 50 | 50 | — |
| Haze DPHA | % | 0.07 | 0.05 | 0.06 | 0.11 | 0.73 | 0.01 | 0.00 | 0.00 | 2.42 | 2.51 | 6.51 | — |
| UDMA | % | 0.02 | 0.30 | 0.22 | 0.38 | 0.54 | 0.09 | 0.00 | 0.00 | 2.13 | 1.63 | 2.62 | — |
| TMPTGE | % | 0.00 | 0.08 | 0.06 | 0.11 | 0.32 | 0.13 | 0.00 | 0.00 | 0.47 | 0.46 | 0.81 | — |
| OPPA | % | 2.59 | 0.65 | 0.24 | 2.98 | 6.72 | 0.12 | 0.00 | 0.00 | >20 | >20 | >20 | — |

*[1] in the table, the symbols for silane coupling agents represent the compounds listed below.
M: 3-methacryloxypropyltrimethoxysilane
A: 3-acryloxypropyltrimethoxysilane
P: phenyltrimethoxysilane
TF: 3,3,3-trifluoropropyltrimethoxysilane In Table 1, when OPPA was used in comparative examples 1-1 to 1-3, haze values were more than 20, and the paint films turned white or there was unevenness in the paint films.

Further, in comparative example 1-4, a transmittance of the coated $ZrO_2$ dispersion liquid was less than 50% T, and dispersion stability of the $ZrO_2$ particle was poor.

Note that the BET specific surface area of the coated $ZrO_2$ particle of comparative example 1-4 was a BET specific surface area measured after the coated $ZrO_2$ particle was obtained by a dry process and then ground in a mortar.

According to Table 1, the paint films of each example varied in transparency (haze) depending on the monomer types due to suitability of the coated $ZrO_2$ particle with the monomer types, but there was a clear tendency that a larger proportion of the BET specific surface area of the coated $ZrO_2$ particle to the BET specific surface area of the uncoated $ZrO_2$ particle resulted in higher compatibility with the monomers. In other words, there was a tendency that the larger the proportion of the BET specific surface area of the coated $ZrO_2$ particle to the BET specific surface area of the uncoated $ZrO_2$ particle, the lower the haze of the paint films.

Further, in example 1-4 in which the increased theoretical surface coating rate was employed, a rate of hydrophobization of the coated $ZrO_2$ particle was increased, and the paint films made by mixing the particle with the various types of monomers tended to have reduced haze and increased transparency.

Further, it is inferred that a $ZrO_2$ particle treated by a dry process as in comparative example 1-4 rather than by a wet process and also having a small particle size of tens of nanometers quickly loses fluidity to be in such an agglomeration state as compressed powder and cannot be uniformly mixed and dispersed, and thus cannot be uniformly coated with a silane coupling agent.

Note that, when a primer-mixed paint was prepared by combining each of the $ZrO_2$ dispersion liquids of examples 1-1 to 1-6 with a publicly-known compound constituting a primer layer, for example, a polyurethane-based resin such as SUPERFLEX 150 (manufactured by DKS Co. Ltd.), EVAFANOL HA-170 (manufactured by NICCA CHEMICAL CO., LTD.) or the like, and evaluated in the same manner, the same low haze and dispersion stability of the $ZrO_2$ particle are attained.

TABLE 2

|  |  | Example | | | | | Comparative example |
|---|---|---|---|---|---|---|---|
|  |  | 2-1 | 2-2 | 2-3 | 2-4 | 2-5 | 2-1 |
| Surface-treated particle |  | Example 1-1 | Example 1-1 | Example 1-1 | Example 1-1 | Example 1-1 | Comparative example 1-2 |
| Post-coating BET specific surface area (dry condition) | $m^2/g$ | 106 | 106 | 106 | 106 | 106 | 29 |
| Proportion of post-coating BET specific surface area to pre-coating BET specific surface area | % | 73.1 | 73.1 | 73.1 | 73.1 | 73.1 | 20.0 |
| Dispersion medium |  | MeOH | PGME | MEK/IPA | PGMEA/IPA | PGMEA/MeOH | PGMEA/MeOH |
| Transmittance of dispersion liquid | % T | >80 | >80 | >80 | >80 | >80 | 52 |
| Median diameter D50 of coated $ZrO_2$ particle in dispersion liquid | nm | 15 | 11 | 22 | 16 | 14 | 77 |
| Post-redispersion BET specific surface area (dry condition) | $m^2/g$ | 87 | 97 | 93 | 97 | 93 | 7 |

According to Table 2, for the dispersion liquid containing the coated $ZrO_2$ particle that the proportion of the BET specific surface area of the coated $ZrO_2$ particle to the BET specific surface area of the uncoated $ZrO_2$ particle was large, even if the coated $ZrO_2$ particle contained in the dispersion liquid was dispersed in other dispersion media, small median diameters of the coated $ZrO_2$ particle and high transmittances of resulting dispersion liquids were attained while the degrees of dispersion varied depending on the types of dispersion media due to suitability of the coated $ZrO_2$ particle with the types of dispersion media. This fact shows that the $ZrO_2$ dispersion liquid of the present invention enables the coated $ZrO_2$ particle in the dispersion liquid to be re-dispersed in other dispersion media, and the dispersion liquids in which the coated $ZrO_2$ particle is re-dispersed also attain the same effects as the $ZrO_2$ dispersion liquid of the present invention.

On the other hand, for the dispersion liquid that the proportion of the BET specific surface area of the coated $ZrO_2$ particle to the BET specific surface area of the uncoated $ZrO_2$ particle was less than 36%, even if the coated $ZrO_2$ particle in the dispersion liquid was dispersed in another dispersion medium, it resulted in a state where dispersion was insufficient, the transmittance of the dispersion liquid was low and the secondary $ZrO_2$ particle of the $ZrO_2$ particle was large.

The invention claimed is:

1. A $ZrO_2$ dispersion liquid comprising: a $Zro_2$ particle coated with a silane coupling agent, and a dispersion medium for the $ZrO_2$ particle, wherein a BET specific surface area of the $ZrO_2$ particle coated with the silane coupling agent obtained by removing the dispersion medium is 36% or more of a BET specific surface area of the $Zro_2$ particle before coating with the silane coupling agent, and an average primary particle size of the $ZrO_2$, particle before coating with the silane coupling agent is 3.0 nm or more and 20.0 nm or less.

2. The $Zro_2$ dispersion liquid according to claim 1, wherein the $ZrO_2$ dispersion liquid is for use in coating agents.

3. A curable composition comprising, the $ZrO_2$ dispersion liquid according to claim 1.

4. The curable composition according to claim 3, wherein the composition comprises a polymerizable compound.

5. The curable composition according to claim 4, wherein the polymerizable compound is a curable resin.

6. A method for producing a $ZrO_2$ dispersion liquid containing a $ZrO_2$ particle coated with a silane coupling agent, comprising:

mixing a $ZrO_2$ particle with a dispersion medium for the $ZrO_2$ particle, an average primary particle size of the $ZrO_2$ particle being 3.0 nm or more and 20.0 nm or less; and reacting the $ZrO_2$ particle with the silane coupling agent in the obtained mixture, wherein the reaction of the $ZrO_2$ particle with the silane coupling agent is carried out until a BET specific surface area of the $ZrO_2$ particle coated with the silane coupling agent obtained by removing the dispersion medium from the mixture during the reaction reaches 36% or more of a BET specific surface area of the $ZrO_2$ particle before coating with the silane coupling agent.

7. The method for producing a $ZrO_2$ dispersion liquid according to claim 6, wherein the mixture contains a catalyst, and the $ZrO_2$ particle is reacted with the silane coupling agent in the presence of the catalyst.

8. The method for producing a $ZrO_2$ dispersion liquid according to claim 6, wherein a reaction temperature of the $ZrO_2$ particle and the silane coupling agent is 10° C. or more and 100° C. or less.

9. The method for producing a $ZrO_2$ dispersion liquid according to claim 6, wherein a reaction time of the $ZrO_2$ particle and the silane coupling agent is 1 hour or more.

10. The method for producing a $ZrO_2$ dispersion liquid according to claim 6, wherein the dispersion medium is removed from the $ZrO_2$ dispersion liquid, and resulting powder containing the $ZrO_2$ particle coated with the silane coupling agent is dispersed in another dispersion medium.

* * * * *